United States Patent [19]

Holm et al.

[11] Patent Number: 4,647,224
[45] Date of Patent: Mar. 3, 1987

[54] DISPOSABLE MAXIMUM READING THERMOMETER AND A METHOD FOR THE PRODUCTION THEREOF

[75] Inventors: Karl Holm, 4, Rudesvej, Holstebro, Denmark, DK-7500; Hans F. Bisgaard, Hasselager, Denmark

[73] Assignee: Karl Holm, Holstebro, Denmark

[21] Appl. No.: 741,219

[22] Filed: Jun. 5, 1985

Related U.S. Application Data

[63] Continuation of Ser. No. 467,487, Feb. 9, 1983, abandoned.

[30] Foreign Application Priority Data

Jun. 9, 1981 [GB] United Kingdom ................. 8117648

[51] Int. Cl.$^4$ ............................................ G01K 11/12
[52] U.S. Cl. .................................... 374/162; 374/161; 374/106; 374/190
[58] Field of Search ............... 374/190, 187, 201, 105, 374/193, 194, 202, 106, 161, 162, 191; 116/206, 207, 216, 219

[56] References Cited

U.S. PATENT DOCUMENTS

| | | | |
|---|---|---|---|
| 3,487,693 | 1/1970 | Weinstein | 374/193 |
| 3,561,271 | 2/1971 | Camejo | 73/371 |
| 3,688,582 | 9/1972 | Gradishar | 73/371 |
| 3,872,729 | 3/1975 | Ayres | 374/105 |
| 3,915,004 | 10/1975 | Nollen et al. | 73/371 |
| 3,938,388 | 2/1976 | Klinger | 374/193 |
| 3,961,530 | 6/1976 | Helgesson | 73/339 |
| 3,961,532 | 6/1976 | Kukuruzinski | 374/190 |
| 4,108,002 | 8/1978 | Rowe et al. | 374/190 |
| 4,170,138 | 10/1979 | Wiebe | 73/371 |
| 4,222,268 | 9/1980 | Greenberg et al. | 73/371 |
| 4,229,975 | 10/1980 | Rowe | 73/371 |

FOREIGN PATENT DOCUMENTS

| | | | |
|---|---|---|---|
| 963022 | 11/1956 | Fed. Rep. of Germany . | |
| 2238723 | 2/1973 | Fed. Rep. of Germany . | |
| 1012572 | 4/1952 | France | 374/201 |
| 1260601 | 4/1961 | France . | |
| 7100893 | 8/1971 | Sweden . | |
| 905211 | 9/1962 | United Kingdom . | |
| 351787 | 9/1972 | U.S.S.R. | 374/190 |

Primary Examiner—Charles Frankfort
Assistant Examiner—W. Morris Worth
Attorney, Agent, or Firm—Stiefel, Gross, Kurland & Pavane

[57] ABSTRACT

A disposable maximum reading thermometer comprises a body (40) in which a capillary passage is defined, a reservoir (41) communicating with the passage and a heat expansible indicator medium (46) contained in the reservoir. The reservoir and the passage are adapted to allow expansion of the medium in the passage when the medium is subjected to heating. At least a part of the passage wall exposable to the indicator medium is adapted to undergo a detectable and irreversible change of its light penetration characteristics when brought into contact with the medium. The capillary passage is defined by a rod (48) arranged in a longitudinally extending bore (42) of the body (40). The surface of the rod is frosted (matt) or opalized, preferably by a mechanical treatment, and adapted to be deopalized when brought into contact with the medium. The medium is preferably a greasy substance having an index of refraction substantially identical to the index of refraction of the material of the body (40) and a melting point range of some degrees centigrade in the relevant temperature range.

32 Claims, 18 Drawing Figures

U.S. Patent  Mar. 3, 1987  Sheet 1 of 2  4,647,224
Fig. 1.
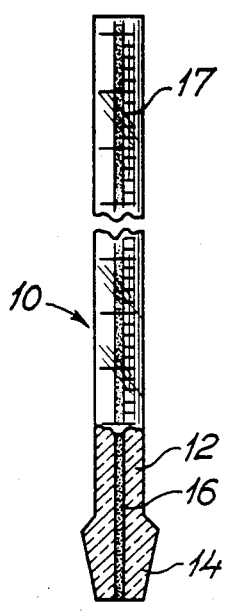
Fig. 2.
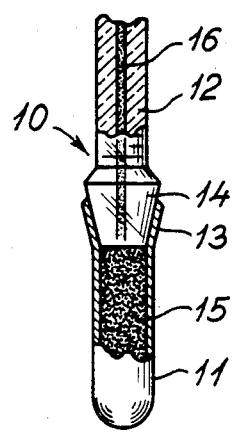
Fig. 3.
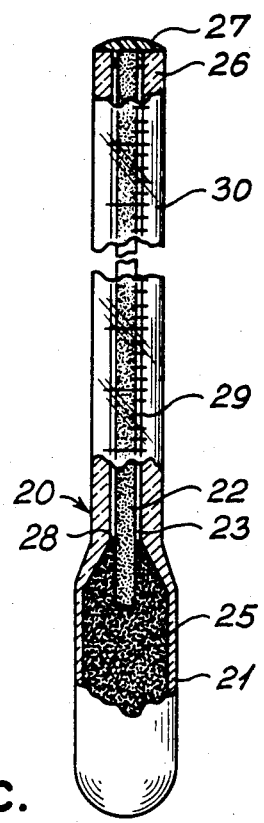
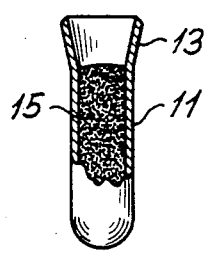
Fig. 4a.
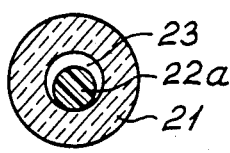
Fig. 4b. Fig. 4c.
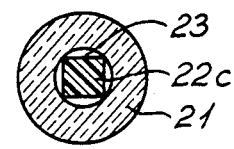
Fig. 5.
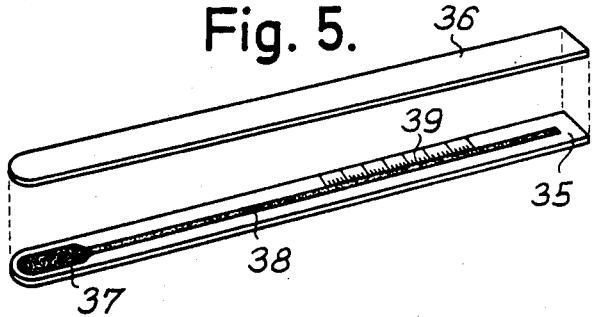
Fig. 6.
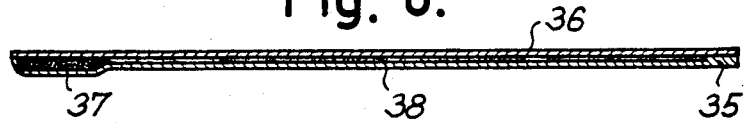

DISPOSABLE MAXIMUM READING THERMOMETER AND A METHOD FOR THE PRODUCTION THEREOF

This is a continuation of U.S. application Ser. No. 467,487, filed Feb. 9, 1983, now abandoned.

The present invention relates to disposable maximum reading thermometers and to methods for producing such thermometers.

BACKGROUND OF THE INVENTION

As is well known, the typical thermometer in present use is made from a glass tube in which mercury or another suitable expansible fluid for indicating temperature is contained in a reservoir and is free to expand into a capillary passage through a constriction which is adapted to maintain the expansible fluid in the capillary passage upon subsequent cooling of the thermometer unless the fluid is "shaken down". When glass thermometers are used, there is, of course, the ever present danger of breakage either during handling or use of the thermometer. Particularly for clinical use, this risk of breakage is especially dangerous with glass mercury thermometers because of the possibility of ingestion or introduction of glass fragments and because of the toxicity of mercury. Moreover, the repeated use of glass thermometers by the same individual or different individuals requires repeated sterilization and increases the possibility of cross-contamination due to of inadequate or incomplete sterilization of the thermometer. This problem is particularly acute in hospitals, clinics and the like. Therefore, several attempts have been made in order to provide a disposable thermometer, thus eliminating the sterilization problem. However, production of a conventional glass-mercury thermometer is rather complicated and therefore expensive because of the construction of the thermometer, especially the constriction, and because of the components involved, especially the mercury. Therefore, a conventional glass-mercury thermometer may not be used as a disposable, maximum reading thermometer, firstly for economical reasons, and secondly, for environmental and pollution reasons.

Because of the above-described inherent problems associated with glass-mercury thermometers, various types of non-breakable, non-mercury thermometers have been proposed some of which have been constructed basically identically to conventional glass-mercury thermometers, thus including the above-described constriction. However, non-breakable, non-mercury, disposable maximum reading thermometers constructed basically identically to conventional breakable, mercury-glass thermometers have not been commercially accepted, primarily for economic reasons.

Several attempts to provide a disposable, maximum reading thermometer of the non-breakable, non-mercury type have been carried out in order to provide a more simple construction than the one known from conventional glass-mercury thermometers, thus eliminating the above-described constriction. However, these attempts have not hitherto provided commercially accepted disposable maximum reading thermometers guaranteeing a reliable and lasting indication of the maximum temperature.

Therefore, it is an object of the present invention to provide a disposable maximum reading thermometer of the above-described kind which is capable of providing a lasting and highly accurate maximum temperature indication and which may be produced in an economic way.

SUMMARY OF THE INVENTION

The present invention relates to a disposable, maximum reading thermometer which shows the desired features discussed above and which may be produced in an economic way.

The thermometer of the invention comprises:
(a) a body in which a capillary passage is defined,
(b) a reservoir communicating with said passage, and
(c) a heat expansible indicator medium contained in said reservoir, the reservoir and the passage being adapted to allow expansion of the medium into the passage when the medium is subjected to heating, at least a part of the passage wall exposable to said indicator medium being adapted to undergo a detectable and irreversible change of its light penetration characteristics when brought into contact with the medium.

For most purposes, e.g. for clinical purposes, the body will have an elongated shape, the capillary passage extending longitudinally within said elongated body and the reservoir communicating with one end of said capillary passage in order to provide a conventionally shaped, slim thermometer.

In the present context, the term "detectable", as used in connection with a change in light penetration characteristics, indicates a change which may be detected from outside by any practical means, normally simply by visual means. The term "irreversible change" indicates a change that remains detectable at a maximum indication level in the capillary passage when the indicator medium contracts on cooling.

According to a first embodiment of the invention, the part of the passage wall which is adapted to undergo a detectable and irreversible change of its light penetration characteristics may be constituted by an interior surface of a capillary bore.

According to another embodiment of the invention, the body may be composed of two parts which are adapted to be assembled into said body, at least one of said parts being provided with a surface groove adapted to produce said capillary passage when said parts have been assembled.

In this embodiment of the invention, it is preferred that the surface groove further constitutes the part of the passage wall which is adapted to undergo a detectable and irreversible change of its light penetration characteristics. The two parts of the body may be made of the same material, or the two parts may be made of two different materials, one of which exhibits good thermal conductivity in order to increase the temperature response of the thermometer.

According to a further, preferred embodiment of the invention, a rod may be arranged in a longitudinally extending bore in the body so that the rod and the bore together define the capillary passage. In this preferred embodiment of the invention, the bore wall may constitute the part of the passage wall which is adapted to undergo a detectable and irreversible change of its light penetration characteristics, but it is preferred that a surface part of the rod constitutes said part of the passage wall; in this way, it becomes possible to establish said part of the passage wall by suitable treatment of an exterior surface part of the rod prior to arranging the rod in the bore.

According to a preferred aspect of the invention, the part of the passage wall which is adapted to undergo a detectable and irreversible change of its light penetration characteristics is frosted (matt) so that this part appears visually as an opalized part of the passage wall, in other words, causes a diffraction of light, and the indicator medium is adapted to cause an irreversible, that is, substantially permanent or lasting, deopalization of said part of the passage wall when brought into contact therewith, in other words, to a substantial extent permanently eliminates the diffraction. In order to cause an irreversible deopalization, the medium should have such surface tension and viscosity properties that a lasting or substantially permanent smoothening of the frosted surface is obtained, also after cooling and consequent retraction of medium.

The frosted wall part may, e.g., be provided by mechanical treatment and may have a surface roughness, expressed by $R_{max}$, of between 0.1 $\mu m$ and 400 $\mu m$. The indicator medium may be a medium which has a refractive index which is substantially identical to the refractive index of the wall part material, so that the medium, when brought into contact with the frosted wall part, will deopalize the wall and which, when medium is allowed to cool and thus retracts, will provide a substantially lasting smoothened surface of the wall.

Thus, when the wall part material is a plastics material (which is preferred according to the invention), the refractive index of the wall part material will normally be in the range of 1.4–1.6, in particular about 1.45–1.6, and therefore, it is preferred that the medium also has a refractive index within said range.

Especially when employing a separate rod which is adapted to be mounted in a longitudinally extending bore of the body, the surface or a part of the surface of the rod may advantageously be prepared so as to be deopalized when brought into contact with said medium. In order to increase the detectability of the irreversible change of the light penetration characteristics of the part of the passage wall adapted to undergo a detectable and irreversible change of its light penetration characteristics, the medium may, if desired, contain a colouring agent which causes a colouration of said part of the passage wall when brought into contact therewith.

As mentioned above, the frosting of the above-mentioned part of the passage wall is normally obtained by mechanical treatment, such as reaming or other treatment performed by means of a cutting tool. However, the frosting may also be constituted by a crackled coating or, alternatively, be constituted by a porous surface part.

In accordance with another apsect according to the invention, said part of the passage wall may be provided with a coating or a film of a material which causes a detectable indication when brought into contact with the heat expansible indicator medium. In accordance with this aspect, the coating or film and the medium together constitute an indicator system, such as an acid-base indicator system or a redox indicator system.

In an acid-base indicator system, the coating or film may contain an acid-base indicator film and the medium may contain a basic or acid medium or, alternatively, the coating or film may be acid or basic and the medium may contain an acid-base indicator. Correspondingly, in a redox indicator system, the coating or film may contain a redox indicator and the medium may be a reducing or oxidizing medium or, alternatively, the coating or film may contain a reducing or oxidizing constituent and the medium may contain a redox indicator.

In accordance with the above-described aspect, the coating or film may be adapted to be etched by said medium when brought into contact therewith, thereby causing said detectable indication or the coating or film may be a non-coloured substance which is converted into a coloured substance when brought into contact with the medium. The conversion of a non-coloured substance into a coloured substance may, e.g., be provided by means of an enzyme and a substrate to an enzyme. Thus, the non-coloured substance may be a substrate to an enzyme and said medium may contain said enzyme or the non-coloured substance may contain an enzyme and said medium may contain a substrate to said enzyme.

In accordance with the aspect in which a coating or a film is adapted to cause a detectable indication when brought into contact with the heat expandsible indicator medium, the coating may be adapted to generate a deposit when brought into contact with the medium, thereby causing the detectable indication. Such deposit indications may be generated by means of well-known chemical reagents reacting with each other to result in precipitation; alternatively, the coating may include particles of a highly colouring substance which are dissolved in the medium when brought into contact therewith. The highly colouring substance may e.g. be potassium permanganate.

The indicator medium is preferably a greasy substance, in particular a greasy substance with a melting point range of some degrees centigrade, e.g. 2–6 degrees centigrade, such as about 4 degrees centigrade, in the relevant temperature range which is to be measured by means of the thermometer. When the thermometer is for clinical use, the indicator medium is preferably a greasy medium with a melting point range between about 35° C. and about 42° C., such as between 36° and 40° C. or 36.5° and 40.5° C. Greasy substances which show such a temperature range are e.g., polyalkyleneglycols and fats. As an example of fats which conform to these characteristics may be mentioned cocoa butter admixed with SOS (glycerol esterified with stearic acid-oleic acid-stearic acid). As examples of suitable polyalkyleneglycols may be mentioned polyethyleneglycol, polypropyleneglycol and copolymers of ethyleneglycol and propyleneglycol. The polyalkyleneglycols should have such a molecular weight or molecular weight range that they have a melting range in the desired temperature range. As examples of suitable polyalkyleneglycols which fulfil this purpose when the thermometer is a thermometer for clinical use may be mentioned polyethyleneglycol having a molecular weight of 400, polyethyleneglycol having a molecular weight of 1550, and polyethyleneglycol having a molecular weight of 4000, all of which are commercial products. These polyethyleneglycols may be used alone or in admixture with each other or with other polyalkyleneglycols. Thus, for example, the greasy substance serving as indicator medium may comprise from 0 to 100 percent of each of these polyethyleneglycol types. A mixture comprising all three types is often preferred, and an example of a mixture which is presently contemplated to be optimal comprises about 50–95 percent, such as 90 percent, of polyethyleneglycol 1550, 1–5 percent, such as 2 percent, of polyethyleneglycol 400 and 5–20 percent, such as 8–12 percent, of polyethyleneglycol 4000. All of these percentages are by weight.

A particular advantage of the polyethyleneglycols is that they are non-toxic and are easy to colour. While, for instance, polyalkyleneglycols in a molecular weight range of from about 300 to about 5000, in particular from about 400 to about 4000, are very valuable greasy substances for use as indicator media in the thermometers of the present invention, fats, either vegetable or animal fats, with a molecular weight range of from about 500 to about 900 comprise another class of useful greasy substances. One advantage of the use of greasy substances with a melting point range in the relevant temperature range is that they show a particularly high heat expansion during the melting process. Also, greasy substances pertaining to these classes of substances show excellent properties as deopalizing agents which cooperate with a frosted plastic or glass surface of the capillary passage wall.

In the above-described embodiments of the invention, the heat expansible medium may comprise a liquid and a melting fuse which is provided at said one end of the capillary passage, the melting fuse being made of substance having its melting point just below the relevant temperature range. When arranging the melting fuse above the medium contained in the reservoir, it is preferred that the melting fuse substance has a lower density than the medium. When employing a melting fuse in combination with a liquid contained in the reservoir, either the liquid or the melting fuse substance may be adapted to cause the change of light penetration characteristics.

In the above-described embodiments of the invention, the reservoir may be constituted by a separate reservoir body attached to said body so that the heat expansible indicator medium may be introduced in the reservoir prior to attaching the two bodies to one another, thus, eliminating the risk of causing said detectable and irreversible change in the light penetration characteristics when introducing the medium. However, in the above-described second embodiment and the above-described third, preferred embodiment of the invention, the reservoir may be constructed as a reservoir in said body without causing risk of destruction of the thermometer when introducing the heat expansible indicator meidum, since the part of the passage wall adapted to undergo a detectable and irreversible light penetration characteristics change may be arranged upon introducing the medium into the reservoir.

When employing a separate reservoir body, the reservoir body is preferably made of aluminum in order to reduce the heat transmission time of the reservoir body wall, thus decreasing the overall response time of the thermometer.

However, the reservoir body and the thermometer body may be made of the same material in order to facilitate attaching said two bodies to one another and, furthermore, in order to eliminate internal heat expansion stresses within the thermometer.

For most purposes, it is preferred that the thermometer body is made of plastics and that said rod is also made of plastics so that inexpensive and easily workable components are provided. The plastics materials may be selected from the group: polyvinyl chloride, polystyrene, polyacrylnitrilestyrene, polyethylenemethacrylate, and polycarbonate, all of which are transparent, non-toxic, and environmentally acceptable materials.

For high temperature purposes, the thermometer body may be made of glass, such as high temperature resistant glass.

All the above described embodiments of the invention are preferably provided with markings serving as a temperature scale adjusted or calibrated relative to the components of the thermometer, relative to the amount of heat expansible indicator medium, and relative to the capillary passage dimensions.

The present invention also relates to methods for producing disposable maximum reading thermometers.

A method for producing such a maximum reading thermometer may, according to the invention, comprise the following steps:
(a) forming an body in which a capillary passage is defined,
(b) providing a reservoir communicating with said passage, and
(c) arranging a heat expansible indicator medium within said reservoir in such a manner that the reservoir and the passage are adapted to allow expansion of the medium into the passage when the medium is subjected to heating, at least part of the passage wall being adapted to undergo a detectable and irreversible change of its light penetration characteristics when brought into contact with the medium.

For producing the above-described first embodiment of the invention, the thermometer body may be formed by casting the body on a thin rod which subsequent to cooling is retracted from the body so that a capillary bore is provided within the body.

However, the body may advantageously be formed by extrusion of a tube having a longitudinally extending bore, by cutting said tube into predetermined lengths and arranging a rod within said bore in order to define said capillary passage so that a thermometer of the above-described, preferred type is obtained. For producing an interior coating of said tube, the tube may be coextruded with an interior coating thereof and, subsequent to coextrusion, said tube may be cooled or stretched in order to make said coating crackle so as to create a frosted or opalized part of the passage wall adapted to be exposed to a medium causing deopalization of said part of the passage wall. For creating a frosted or opalized part of the passage wall, the rod may alternatively be reamed prior to arranging the rod within said bore, or the rod may be coextruded with an outer coating thereof which also, subsequent to coextrusion, is cooled or stretched in order to make said coating crackle.

In providing the capillary passage by means of a rod arranged within a bore, the reservoir may be provided as a reservoir of said body and the heat expansible indicator medium may be filled into said reservoir through the bore prior to arranging the rod in the bore.

However, as explained above, the reservoir may advantageously be provided as a separate reservoir body which is attached to the thermometer body. When the reservoir is provided as a separate reservoir body, it is possible to arrange the heat expansible indicator medium into the reservoir body prior to attaching the reservoir body to the thermometer body, thus eliminating the risk of causing desctruction of the thermometer when introducing the heat expansible medium.

The medium may preferably be arranged in said reservoir in a molten state, which makes it possible to obtain an extremely exact dosing of the medium.

In order to obtain a highly accurately calibrated thermometer, the medium may be maintained at a predetermined temperature subsequent to arranging the medium in the reservoir, whereupon the rod may be introduced in the bore and immersed in the medium until the surface of the medium reaches a temperature scale marking corresponding to said predetermined temperature. Alternatively, the medium may be allowed to substantially solidify at a predetermined temperature, subsequent to arranging the medium in the reservoir, whereupon the rod may be introduced in the bore, the lower end of the rod arranged on top of the substantially solidified medium and a temperature scale marking corresponding to the predetermined temperature applied on level with the lower end of the rod.

In order to provide a thermometer comprising two separate components, the body may be formed by assembling two parts, at least one of said parts being provided with a surface groove which produces said capillary passage when assembling said parts. Furthermore, when producing such a thermometer having two parts, the reservoir may preferably be formed as a reservoir cavity of said one part and said heat expansible indicator medium may be arranged in said reservoir cavity prior to assembling said parts. The two parts may adequately be assembled by ultrasonic welding.

BRIEF DESCRIPTION OF THE DRAWINGS

The invention will now be further described with reference to the accompanying drawings wherein:

FIG. 1 and FIG. 2 show vertical sectional veiws of a first embodiment of a disposable maximum reading thermometer according to the invention, FIG. 3 a vertical sectional view of a second embodiment of a disposable maximum reading thermometer according to the invention, FIG. 4A, FIG. 4B, and FIG. 4C horizontal sectional views of alternative embodiments of a thermometer component of the second embodiment shown in FIG. 3, FIG. 5 a perspective view of a third embodiment of a disposable maximum reading thermometer according to the invention, FIG. 6 a sectional view of the third embodiment of the invention shown in FIG. 5, FIG. 7, FIG. 8.

DETAILED DESCRIPTION OF THE DRAWING

Figure 7:
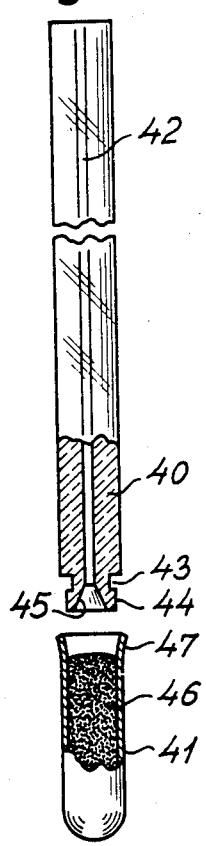

FIG. 1 and FIG. 2 shows a first embodiment of a disposable maximum reading thermometer according to the invention designated 10 in its entirety. The thermometer 10 comprises two main components designated 11 and 12, respectively. The component 11 constitutes a reservoir part of the thermometer and the component 12 constitutes a body part of the thermometer. At its upper end, the component 11 is provided with a frusto conical extension 13 which is adapted to cooperate with a corresponding conical lower end portion 14 of the component 12. The interior space of the component 11 is filled with a predetermined, exactly does amount of a heat expansible medium e.g. a greasy substance which is introduced into the interior space of the component 11, preferably in a molten state. A longitudinally extending capillary bore 16 in the component 12 is open at the lower end of the component 12 and may be sealed as the upper end of the component 12 (not shown in the drawing) or, alternatively, the capillary bore 16 is open at both ends. The component 12 is provided with a temperature scale 17 which may preferably be printed on the outer surface thereof.

The two components 11 and 12 may be joined together in any appropriate manner, e.g. glued or welded together, joined in a heat sealing process or joined by means of cooperating internal and external threads provided at the inner surface of the conical extension 13 of the component 11 and on the outer surface of the conical end portion 14 of the component 12, respectively.

FIG. 1 shows the components of the first embodiment of the invention before assembly, and FIG. 2 shows the same components after joining the thermometer components 11 and 12 together as described above. When the capillary bore 16 is sealed at the upper end of the compnent 12, the joining process is carried out while applying vacuum to the interior of the thermometer, while no such precautions need be taken when the capillary bore 16 is open at both ends.

The capillary bore 16 may be produced in any appropriate manner which guarantees that at least a part of the capillary wall is adapted to cause a detectable and irreversible change of the light penetration characteristics of said part of the capillary wall when brought into contact with the heat expansible indicator medium which rises into the capillary bore 16 when subjected to heating within the relevant temperature range. However, the capillary bore 16 may advantageously be produced by casting the capillary tube components 12 on a thin rod which is retracted from the component 12 subsequent to cooling so that the interior surface of the capillary bore 16 becomes frosted. When the heat expansible indicator medium 15, which is preferably a greasy medium, rises in the capillary bore 16, the interior frosted surface of the capillary bore is deopalized to the level to which the indicator medium column rises, and when the indicator medium column retracts upon cooling, the interior frosted surface of the capillary bore remains covered with a layer of said greasy medium which causes a visibly detectable change of the light penetration characteristics of the capillary wall since the greasy medium fills up the minor irregularities of the capillary wall and, thus, creates a smooth inner surface which does not cause any substantial diffraction of the light trasmission through the capillary wall.

The heat expansible indicator medium many, e.g., be polyalkyleneglycol mixture.

The two thermometer components 11 and 12 may be made of any transparent, non-toxic, preferably environmentally acceptable, plastics material, such as polyvyinylchloride, polystyrene, polyacrylnitrilstyrene, polymethylmethacrylate, or polycarbonate.

In FIG. 3, a second embodiment of a disposible maximum reading thermometer according to the invention is shown designated 20 in its entirety. The embodiment of the invention shown in FIG. 3 differs from the above described first embodiment of the invention shown in FIG. 1 and FIG. 2 in two ways. Firstly, the two components 11 and 12 shown in FIG. 1 and 2 are constituted by a single body 21 in the embodiment shown in FIG. 3. Secondly, the capillary wall part which, in accordance with the present invention, is adapted to cause a detectable and irreversible change of the light penetration characteristics when brought into contact with the heat expansible indicator medium is provided on a rod 22 with a frosted surface, the rod 22 being arranged in a longitudinally extending bore 23 of the body 21. In conjunction with the longitudinally extending bore 23, the rod 22 defines a capillary passage which extends from a bottom reservoir 25 to an upper end 26 of the body 21. The upper end is sealed by means of a cap 27 also securing the rod 22 relative to the bore 23. The bottom reservoir 25 is filled with a heat expansible indicator medium in which the lower end of the rod 22 is immersed. the upper surface of the indicator medium is designated by the reference numeral 28. Furthermore, the body 21 is provided with temperature scale markings 29 which are preferably provided at the exterior surface of the body 21 by printing. The markings 29 are arranged in spaced apart relationship so that the distance between two markings corresponds to a predetermined temperature increase which causes a corresponding rise of the indicator medium surface 28 within the capillary passage between the rod 22 and the interior surface of the bore 23.

The body 21 may be made of the same material as the thermometer components 11 and 12 shown in FIGS. 1 and 2. Furthermore, the indicator medium 25 may be of the same type as the indicator medium 15 of the first embodiment of the invention in FIGS. 1 and 2. The surface of the rod 22 is frosted or opalized, preferably in accordance with a process which is described in greater detail below, and the material of the rod 22 is preferably identical to the material of the body 21. The cap 27 may be provided as a hot melt glue, as a solvent based glue or as a cathalytically hardening glue. Alternatively, the rod 22 and the body 21 may be welded together, e.g. by ultrasonic welding.

The rod 22 may have any appropriate cross sectional shape. Three alternative cross sectional shapes of the rod 22 are shown in FIGS. 4A, 4B and 4C. FIG. 4A shows a rod 22A with a circular cross sectional shape arranged within the longitudinally extending bore 23 of the body 21. Correspondingly, FIG. 4b shows a rod 22b with a triangular cross sectional shape, and FIG. 4C shows a rod 22C with a quadratic cross sectional shape. However, other configurations are possible as will be evident from the description below.

When the heat expansible indicator medium is subjected to heating, it rises in the capillary passage between the inner surface of the longitudinally extending bore 23 and the outer surface of the frosted or opalized rod 22 to a level uniquely corresponding to the temperature to which the medium is subjected. The indicator medium rising in the capillary passage causes a deoplaization of the surface of the rod 22, thus causing a detectable and irreversible change of the light penetration characteristics of the capillary passage wall. The change is clearly visible through the transparent wall of the body 21.

When assembling the embodiment of the invention shown in FIG. 3, firstly, a predetermined, exactly dosed amount of the indicator medium is introduced in the bottom reservoir 25 through the longitudinally extending bore 23. The interior surface of said bore is completely smooth and, consequently, no indicator medium substance is deposited on said interior surface. Preferably, the indicator medium is introduced in a molten state. Secondly, the rod 22 is arranged in the bore 23 at a predetermined level relative to the body 21. Thirdly, the rod 22 is secured relative to the body 21 by means of the cap 27 which also serves to seal the thermometer.

When filling the body reservoir 25 with indicator medium, it is of utmost importance to dose an extremely exact amount of said indicator medium since the volumetric expansion of the indicator medium is determined by the volume of the indicator medium, the coefficient of thermal expansion of said medium, and the temperature increase, and, thus, the maximum temperature to be measured. The volumetric expansion of the indicator medium is transformed into a linear movement of the surface 28 of the indicator medium within the capillary passage. Therefore, the thermometer shown in FIG. 3 in which an opalized or frosted rod is provided may be adjusted or calibrated in a very simple manner. It is assumed that an exactly dosed volume of the indicator medium is introduced into the bottom reservoir 25 at predetermined exactly fixed temperature, preferably, as mentioned above, in a molten state. The frsoted or opalized rod 22 is then introduced into the bore 23 and immersed into the indicator medium contained in the bottom reservoir 25 until the surface 28 reaches a marking 29 corresponding to the exactly fixed filling temperature. Afterwards, the rod 22 is cut off at the upper end of the body 21 and secured thereto by means of the cap 27. Alternatively, the thermometer shown in FIG. 3 may be calibrated in a manner described below in connection with the description of FIGS. 7, 8, and 9. Furthermore, the embodiment shown in FIG. 3 may be provided with a protection against destruction of the thermometer prior to use such as also described in connection with the description of FIGS. 7, 8, and 9.

It should be understood that the above described first and second embodiments of the invention shown in FIGS. 1 and 2 and in FIG. 3, respectively, may be modified in several ways. Thus, the embodiment shown in FIG. 1 and 2 may be altered in such a way that a rod is employed serving the above described adjusting or calibration purpose. In this alternative embodiment, the capillary bore 16 should be enlarged into a significantly large bore corresponding to the bore 23 of the embodiment shown in FIG. 3.

FIGS. 5 and 6 show a third embodiment of the invention, comprising two plate-shaped components or parts designated 35 and 36, respectively. The two parts are adapted to be assembled into a single elongated body by any suitable technique, e.g. by gluing or welding, such as ultrasonic welding. The two parts are preferably made of a transparent plastics material, such as polyvinylchloride, polystyrene, polyacrylnitrilstyrene, polymethylmethacrylate, or polycarbonate. However, one of the two parts may be made of a different material, such as aluminum in order to increase the temperature response of the thermometer. The part 35 is provided with a reservoir cavity 37 and a longitudinally extending groove 38 which is adapted to constitute a part of a capillary passage when the two parts are assembled into a single elongated body. The groove 38 is preferably formed so as to provide an opalized or frosted groove surface which is intended to be deopalized by means of a heat expansible indicator medium contained in the reservoir cavity 37. Alternatively, the part 36 may have a frosted surface or a part of a frosted surface which faces the groove 38 when the parts are assembled and which is intended to be deopalized by said indicator medium. Quite generally, any of the two components 35 and 36 or parts of said components may be adapted to cause a detectable and irreversible change of the light penetration characteristics of the capillary wall in accordance with any of the aspects according to the present invention.

Figure 8:
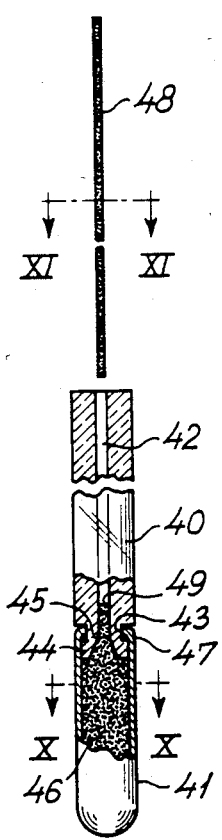
Figure 9:
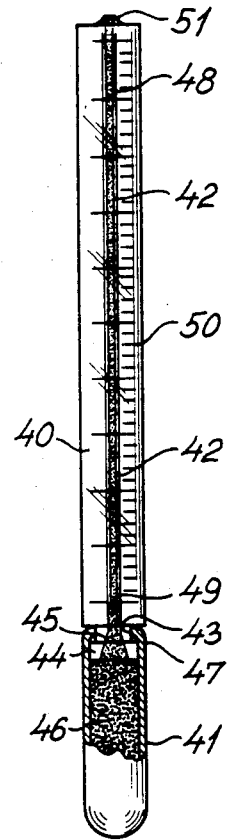
FIG. 9 vertical sectional views of a fourth, preferred embodiment of a disposable maximum reading thermometer according to the invention showing different stages during assembly of the thermometer, FIG. 10 a horizontal sectional view along the line X—X in FIG. 8, FIG. 11 a horizontal sectional view along the line XI—XI in FIG. 8, FIG. 12 a vertical sectional view of a fifth embodiment of a disposable maximum reading thermometer according to the invention, FIG. 13 a horizontal sectional view along the line XIII—XIII in FIG. 12, FIG. 14 corresponding to FIG. 13 a horizontal sectional view along the line XIII—XIII in FIG. 12 of a slightly modified embodiment of the invention, FIG. 15 a perspective view showing one possible way of producing a component of the fifth embodiment of the invention shown in FIG. 12 and 13, and FIG. 16 a vertical sectional veiw of a sixth embodiment of a disposable maximum reading thermometer according to the invention.

In FIGS. 7, 8, and 9 vertical sectional views of the fourth, preferred embodiment of the invention is shown at different stages of the production process. In these figures, identical reference numerals designate identical parts. The thermometer shown in FIGS. 7-9 comprises two main components, an elongated body 40 and a reservoir body 41, respectively. The elongated body 40 is made of a transparent material, such as polyvinylchloride, polystyrene, polyacrylnitrilstyrene, polymethylmethacrylate, or polycarbonate and is provided with a longitudinally extending, central bore 42. The elongated body 40 may be produced in an extrusion process and may thus be manufactured with extremely small tolerances. At the lower end of the elongated body 40, an annular groove 43 is provided and at the lower extremity, at 44, the elongated body 40 has a reduced diameter relative to the overall diameter of the body 40. Furthermore, the elongated body 40 has a frusto conical inlet 45 at its lower end. Although the reservoir body 41 may be made of the same material as the elongated body 40, it is preferred to produce the reservoir body 41 of a material having good thermal conductivity, such as aluminum. For producing the reservoir body 41, a cold pressing process may be employed. Within the reservoir body 41, an exactly dosed, predetermined amount of a heat expansible indicator medium 46 is contained. The indicator medium 46 is preferably a greasy medium having a melting point just below the relevant temperature range. for clinical purposes, i.e. when measuring within the range 25°-45° C., a greasy medium such as a polyethyleneglycol mixture may be employed. The indicator medium 46 is preferably filled into the reservoir body 41 in a molten state. The reservoir body 41 is, at its upper end, provided with a frusto conical end portion 47 which is intended to facilitate the mounting of the elongated body 40 on top of the reservoir body 41.

Subsequent to filling the indicator medium 46 into the reservoir body 41, the elongated body 40 is mounted on top of the reservoir body 41, whereupon the frusto conical end portion 47 of the reservoir body 41 is pressed into the groove 43 in order to secure said two bodies relative to one another. As evident from FIG. 8, a small amount of the indicator medium 46 is pressed into the bore 42 through the inlet 45 when the elongated body 40 is mounted on top of the reservoir body 41. In order to seal the junction of said two bodies, the surface of the reservoir body 41 may be provided with a coating or, alternatively, preferably a covering of the entire outer surface of the body in order to eliminate the metallic touch of the body, alternatively a sealing compound may be arranged in the groove prior to pressing the end of the frusto conical end portion 47 into the groove 43. When the two bodies have been joined and sealed together, a rod 48 with an opalized surface is introduced into the bore 42 until it reaches the upper surface 49 of the indicator medium 46 within the bore 42. At this stage, the indicator medium has been allowed to substantially solidify at a predetermined temperature, and at this stage, the thermometer may be adjusted or calibrated in an extremely simple manner. An exactly dosed amount of said indicator medium has been introduced in the reservoir body 41 and defines, at the temperature in question, a level corresponding to the upper surface 49. Assuming that the temperature is maintained at this predetermined, fixed level and that the rod 48 has an exactly defined length, the upper end of the rod 48, which protrudes from the end of the elongated body 40, may be used as a guide for the longitudinal adjustment of the printing of a temperature scale 50 on the outside of the elongated body 40 so that the scale marking corresponding to the temperature in question is printed at a distance from the upper end of the rod 48 exactly equal to the exactly defined length of the rod and, thus, is arranged exactly at a level corresponding to the lower end of the rod 48 and, consequently, at a level exactly corresponding to the upper surface 49. Finally, the rod 48 is secured relative to the elongated body 40, e.g. glued or welded as indicated at 51, as described above in connection with FIG. 3. Any excessive rod part protruding from the upper end of the elongated body 40 is cut off, if desired. However, the thermometer shown in FIG. 9 may alternatively be calibrated in a manner described above in connection with the description of FIG. 3.

Figure 10:
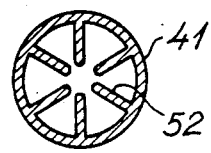

In FIG. 10, a horizontal sectional view is shown along the line X—X in FIG. 8. As mentioned above, the reservoir body 41 is preferably made of aluminum in order to obatin a short temperature response time of the maximum reading thermometer. In order to further increase the responsiveness of the thermometer by increasing the heat transfer from the body 41 to the indicator medium, the aluminum body 41 is provided with ribs 52 protruding from the inner surface of the reservoir body 41 into the interior space of said body.

Figure 11:
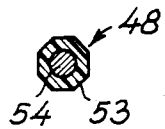

In FIG. 11 a horizontal cross-sectional view along the line XI—XI in FIG. 8 is shown. The rod 48 comprises two components, an interior metal wire 54, which provides mechanical strength, surrounded by a layer 53 of a plastic material, such as polyvinylchloride, polystyrene, polyacrylnitrilstyrene, polymethylmethacrylate, or polycarbonate. The rod 48 is produced in an extrusion process, and subsequent to extrusion, the rod 48 is pulled through a reaming tool in order to provide an octagonal cross sectional shape shown in FIG. 11 and, furthermore, providing an opalized or frosted outer surface. Obviously, other cross sectional shapes than the one shown in FIG. 11 may be provided, e.g. triangular, quadratic, hexagonal, etc. Furthermore, the extrusion and reaming may be performed on a homogeneous plastics wire, without using the metal wire 54. A homogeneous plastics wire may preferably be made of polycarbonate.

When the thermometer is in use, the indicator medium 46 rises into the space betwen the outer surface of the rod 48 and the interior surface of the bore 42, said space constituting a capillary passage, causing a deopalization of the opalized or frosted outer surface of the rod 48, and thus casuing a detectable and irreversible change of the light penetration characteristics of the passage wall.

In an alternative embodiment, the rod 48 is provided with a smooth outer surface and, thus, serves only capillary passage defining and calibration or adjusting purposes. Instead, the interior surface of the bore wall of the elongated body 40 is opalized or frosted. A frosted or opalized interior surface of the bore wall may be obtained in a co-extrusion process in which the elongated body 40 is extruded with an interior surface coating which is adapted to crackle when subjected to cooling or stretching. In this alternative embodiment, the detectable and irreversible change of the light penetration characteristics of the capillary wall is produced by deopalization of the bore wall.

In a slightly modified alternative embodiment, the reservoir body 41 is originally formed having a significantly larger interior volume so that the heat expansible indicator medium is allowed to expand within said enlarged volume when subjected to elevated temperatures, e.g. during storage or transportation, without rendering the thermometer useless. Prior to use, this slightly modified alternative embodiment is mounted in a press tool which is adapted to reduce the interior volume of the reservoir body 41 to an extract predetermined level, thus, making the thermometer ready for use.

In the above described preferred embodiment of the invention shown in FIG. 7–9, a protection against destruction of the thermometer prior to use by subjecting the thermometer to elevated temperatures may be provided in an alternative manner. Instead of securing the rod 48 as shown in FIG. 9, the rod 48 may be supplied as a separate component which is adapted to be introduced into the bore 42 immediately before the thermometer is to be used. In this alternative embodiment, a highly resilient membrane may be mounted at the lower end of the elongated body 42 in order to confine the indicator medium within the interior space of the reservoir body 41, and within the lower part of the bore 42 and the frusto conical inlet 45. In this embodiment, the rod 48 may be provided with a sharp end which is adapted to perforate the membrane when introduced in the bore 42. Furthermore, a membrane may be provided at the upper end of the elongated body 42 in order to prevent dirt and dust from entering into the bore 42, said membrane also being adapted to be perforated by the sharp-ended rod 48 when introducing the rod in the bore 42. However, since the indicator medium only rises to a very low level within the bore 42 when subjected to even elevated temperatures without having the rod 48 mounted in the bore, the first-mentioned membrane may be omitted. In these alternative embodiments, the rod 48 and the elongated body 40 are preferably provided with catching means adapted to secure the rod 48 relative to the bore 42 of the elongated body 40 when correctly introduced in the bore 42. Furthermore, the rod 48 may be mounted in a "ball point pen"-arrangement so that an upper part of the rod 48 protrudes from the upper surface of the elongated body 40 when the thermometer is supplied from the factory. Prior to use of the thermometer, the rod is depressed, thereby making the thermometer ready for use. In this alternative embodiment, the rod 48 is preferably mounted in a seal, such as an O-ring provided at the top of the elongated body 40. In this arrangement, either the rod 48 or the inner surface of the bore 42, together constituting the capillary passage, may be provided with an opalized or frosted surface as described above.

Figure 12:
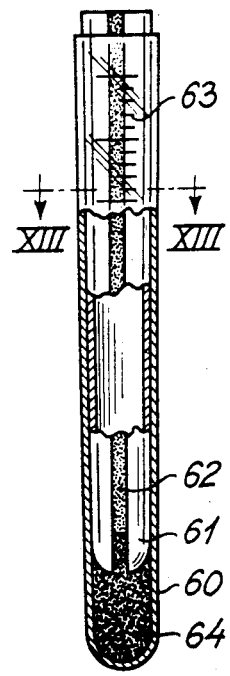

In FIG. 12, a vertical sectional view of a fifth embodiment of the invention is shown. The embodiment shown in FIG. 12 comprises two test-tube-like components designated 60 and 61, respectively, mounted within one another. In the description below, the two components are referred to as the outer test tube 60 and the inner test tube 61, respectively, although it should be understood that the test-tubes, preferably, are made of transparent plastic materials, such a polyvinylchloride, polystyrene, polyacrylnitrilstyrene, polymethylmethacrylate, or polycarbonate. The outer surface of the inner test-tube 61 is provided with a longitudinally extending flattened surface area 62 provided by means of a cutting tool as will be described in greater detail below. The outer surface of the outer test tube 60 is provided with markings 63 constituting a temperature scale. Prior to arranging the inner test-tube 61 within the outer test tube 60, a predetermined, exactly dosed amount of a heat expansible indicator medium 64 is introduced in the bottom of the outer test tube 60. After mounting the inner test tube 61 within the outer test-tube 60, the indicator medium 64 is confined within a space defined between said two test tubes. This space, which constitutes an indicator medium reservoir, communicates with a passage which is defined between the inner surface of the outer test tube 60 and the flattened surface area 61 of the inner test tube 61. The flattened surface area 62 provides a frosted or opalized surface which is deopalized when brought into contact with the indicator medium, preferably a greasy medium such as the above described greasy media, e.g. a polyethyleneglycol mixture.

Figure 13:
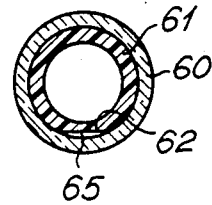
Figure 14:
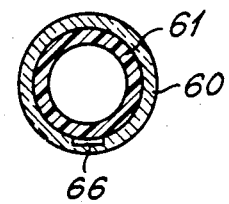

In FIG. 13, a horizontal sectional view along the line XIII—XIII in FIG. 12 is shown. In FIG. 13, the outer test tube 60 and the inner test tube 61 are shown, the latter being provided with the flattened surface area 62 which together with the inner surface of the outer test tube 60 define the above mentioned passage, designated 65 in FIG. 13. In FIG. 14, a horizontal sectional view corresponding to FIG. 13 is shown through a slightly modified embodiment. In this slightly modified embodiment, the opalized or frosted surface, which is adapted to be deopalized when brought into contact with the greasy indicator medium, is provided in a groove 66 with a rectangular cross sectional shape at the interior surface of the outer test tube 60. In this slightly modified embodiment, the outer flattened surface area 62 of the inner test tube 61 is omitted.

Figure 15:
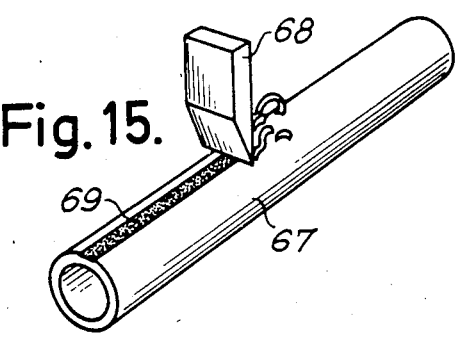

In FIG. 15, a perspective, diagrammatical view of a method for producing a flattened surface area is shown. A tubular body designated by the reference numeral 67 is being machined by means of a cutting tool 68 which provides a longitudinally extending flattened surface area 69. The flattened surfce area 69 constitutes a frosted or opalized surface corresponding to the flattened surface area 62 of the inner test-tube 61 shown in FIG. 12.

Figure 16:
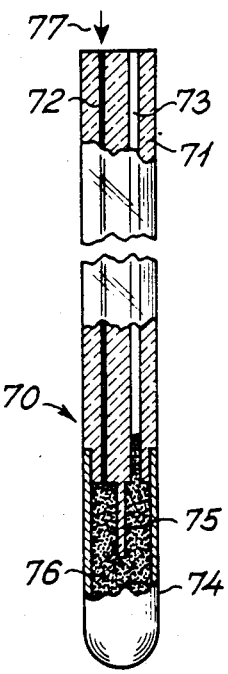

FIG. 16 shows a sixth embodiment of a disposable maximum reading thermometer according to the invention designated 70 in its entirety. The thermometer 70 comprises an elongated body 71 which is preferably made of a transparent plastics material, such as polyvinylchloride, polystyrene, polyacrylnitrilstyrene, polymethylmethacrylate, or polycarbonate. The elongated body 71 is provided with two longitudinally extending bores designated 72 and 73, respectively. As is evident from FIG. 16, the bore 72 has a significantly smaller cross sectional area than the bore 73. At its lower end, the elongated body 71 is attached to a reservoir body 74 basically identical to the above-described reservoir body 41 shown in FIG. 7–10. As is evident from FIG.

16, the smaller bore 72, the space defined within the body 74, and the minor part at the lower end of the larger bore 73 are filled with a heat expansible indicator medium 76. The indicator medium is introduced in the reservoir through the smaller bore 72 in an exactly dosed amount as indicated by the arrow 77. From the lower end of the elongated body 71, a wall-shaped flow-guide 75, cast integrally with the elongated body 71, protrudes into the inner space defined within the reservoir body 74. The flow-guide 75 is adapted to provide a homogeneous filling of the space defined within the reservoir 75. The larger bore 73 is adapted to be provided with a rod substantially identical to the rod 48 shown in FIG. 8 and 9. After filling the indicator medium into the thermometer 70, the smaller bore 72 is sealed by means of a stopper, not shown in the drawing, so that the heat expansible indicator medium is only allowed to expand into the larger bore 73 and, thus, deopalize the rod mounted within the larger bore 73.

We claim:

1. A disposable maximum reading thermometer comprising:
   (a) a body in which a capillary passage is defined,
   (b) a temperature scale located to provide an accurate indication of temperature,
   (c) a reservoir communicating with said passage, and
   (d) a heat expansible indicator medium contained within said reservoir, said capillary passage having a wall, at least part of which is frosted so as to provide an opalized passage wall part, sad indicator medium being capable of expanding into the passage and contacting the wall part when subjected to heat and being capable of causing a detectable and irreversible deopalization of the frosted passage wall part when said medium comes in contact with the frosted passage wall part, thereby providing an indication of temperature with respect to the temperature scale.

2. A thermometer according to claim 1 wherein said body has an elongated shape, said capillary passage extending longitudinally within said elongated body and the reservoir communicating with one end of said capillary passage.

3. A thermometer according to claim 1 wherein said part of the passage wall is constituted by an interior surface of a capillary bore.

4. A thermometer according to claim 1 wherein said body is composed of two parts which are adapted to be assembled into said body, at least one of said parts being provided with a surface groove adapted to produce said capillary passage when said parts have been assembled, and wherein said surface groove further constitutes said part of the passage wall.

5. A thermometer according to claim 1 wherein a rod is arranged in a longitudinally extending bore of said body, the rod and the bore together defining said passage.

6. A thermometer according to claim 5 wherein a surface part of said rod constitutes said part of the passage wall.

7. A thermometer according to claim 41 wherein said frosted wall part has a surface roughness, as expressed by $R_{max}$, of between 0.1 μm 400 μm.

8. A thermometer according to claim 1 wherein the refractive index of said body material and the refractive index of said medium are substantially identical.

9. A thermometer according to claim 8 wherein said two refractive indices are within the range of 1.4–1.6.

10. A thermometer according to claim 1 wherein said heat expansible medium is a greasy substance.

11. A thermometer according to claim 10 wherein said greasy substance is selected from fats and polyalkyleneglycols.

12. A thermometer according to claim 11 wherein the greasy substance is a mixture of polyethyleneglycols with molecular weights in the range of from about 300 to about 5000.

13. A thermometer according to claim 10 wherein the heat expansible medium has a melting point range of about 2-6 degrees Centigrade in the relevant temperature measuring range.

14. A thermometer according to claim 1 wherein said reservoir means is constituted by a separate reservoir body attached to said body.

15. A thermometer according to claim 1 wherein said body is made of plastic.

16. A thermometer according to claim 15 wherein said plastic material is selected from polyvinylchloride, polystrene, polyacrylnitrilstyrene, polymethylmethacrylate, and polycarbonate.

17. A disposable maximum reading thermometer comprising:
   (a) a body in which a capillary passage is defined,
   (b) a temperature scale located to provide an accurate indication of temperature,
   (c) a reservoir communicating with said passage, and
   (d) a heat expansible indicator medium contained within said reservoir, said capillary passage having a wall, at least part of which is coated with a material that chemically interacts with and undergoes a detectable and irreversible indication when brought into contact with the indicator medium, said indicator medium being capable of expanding into the passage and contacting the coated wall part when subjected to heat and being capable of causing a detectable and irreversible indication of temperature when said medium comes into contact with the coated passage wall, thereby providing an indication of temperature with respect to the temperature scale.

18. A thermometer according to claim 17 wherein said body has an elongated shape, said capillary passage extending longitudinally within said elongated body and the reservoir communicating with one end of said capillary passage.

19. A thermometer according to claim 17 wherein said part of the passage wall is constituted by an interior surface of a capillary bore.

20. A thermometer according to claim 17 wherein said body is composed of two parts which are adapted to be assembled into said body, at least one of sad parts being provided with a surface groove adapted to produce said capillary passage when said parts have been assembled, and wherein said surface groove further constitutes said part of the passage wall.

21. A thermometer according to claim 17 wherein a rod is arranged in a longitudinally extending bore of said body, the rod and the bore together defining said passage.

22. A thermometer according to claim 21 wherein a surface part of said rod constitutes said part of the passage wall.

23. A thermometer according to claim 17 wherein the refractive index of said body material and the refractive index of said medium are substantially identical.

24. A thermometer according to claim 23 wherein said two refractive indices are within the range of 1.4–1.6.

25. A thermometer according to claim 17 wherein said heat expansible medium is a greasy substance.

26. A thermometer according to claim 25 wherein the heat expansible medium has a melting point range of about 2° C.–6° C. in the relevant temperature measuring range.

27. A thermometer according to claim 17 wherein said reservoir means is constituted by a separate reservoir body attached to said body.

28. A thermometer according to claim 17 wherein said body is made of plastic.

29. A thermometer according to claim 28 wherein said plastic material is selected from polyvinylchloride, polystyrene, polyacrylnitrilstyrene, polymethylmethacrylate, and polycarbonate.

30. A thermometer according to claim 17 wherein said coating comprises an acid or a base and said heat expansible medium contains an acid-base indicator system, wherein when said medium comes into contact with said coating a detectable and irreversible indication of temperature with respect to the temperature scale is achieved.

31. A thermometer according to claim 17 wherein said coating comprises an acid-base indicator system and said medium contains an acid or base, wherein when said medium comes into contact with said coating a detectable and irreversible indication of temperature with respect to the temperature scale is achieved.

32. A thermometer according to claim 17 wherein said coating and said medium each contain chemical reagents capable of interacting and generating a deposit when said medium comes into contact with said coating, thereby providing an indication of temperature with respect to the temperature scale.

* * * * *